(12) United States Patent
Lee et al.

(10) Patent No.: US 11,892,329 B2
(45) Date of Patent: Feb. 6, 2024

(54) MEASUREMENT SYSTEM USING FIBER BRAGG GRATING SENSOR

(71) Applicant: FBG KOREA INC., Daejeon (KR)

(72) Inventors: Geum Suk Lee, Gyeryong-si (KR); Geum Jun Lee, Daejeon (KR)

(73) Assignee: FBG KOREA INC., Daejeon (KR)

(*) Notice: Subject to any disclaimer, the term of this patent is extended or adjusted under 35 U.S.C. 154(b) by 252 days.

(21) Appl. No.: 17/393,677

(22) Filed: Aug. 4, 2021

(65) Prior Publication Data
US 2022/0099465 A1    Mar. 31, 2022

(30) Foreign Application Priority Data
Sep. 25, 2020    (KR) .................. 10-2020-0125193

(51) Int. Cl.
| | | |
|---|---|---|
| G01D 5/353 | (2006.01) | |
| G01D 21/02 | (2006.01) | |
| G01K 11/3206 | (2021.01) | |
| G01J 3/18 | (2006.01) | |
| G01B 11/16 | (2006.01) | |
| G01B 11/25 | (2006.01) | |
| G01B 11/26 | (2006.01) | |

(52) U.S. Cl.
CPC ....... *G01D 5/35316* (2013.01); *G01B 11/165* (2013.01); *G01B 11/2513* (2013.01); *G01B 11/26* (2013.01); *G01D 21/02* (2013.01); *G01J 3/1895* (2013.01); *G01K 11/3206* (2013.01)

(58) Field of Classification Search
CPC ............... G01D 5/35316; G01D 21/02; G01K 11/3206; G01J 3/1895; G01J 2001/0496; G01B 11/165; G01B 11/2513; G01B 11/26

See application file for complete search history.

(56) References Cited

U.S. PATENT DOCUMENTS

| | | | | |
|---|---|---|---|---|
| 5,297,224 A | * | 3/1994 | Shaw ................. | G01D 5/35383 |
| | | | | 250/227.27 |
| 6,417,507 B1 | * | 7/2002 | Malvern ................. | G01L 1/246 |
| | | | | 250/227.14 |
| 9,009,003 B1 | * | 4/2015 | Chan .................. | G01D 5/35335 |
| | | | | 356/477 |

(Continued)

FOREIGN PATENT DOCUMENTS

| | | |
|---|---|---|
| JP | 5604954 B2 | 10/2014 |
| KR | 10-1057309 B1 | 8/2011 |

(Continued)

*Primary Examiner* — Dominic J Bologna
(74) *Attorney, Agent, or Firm* — NKL LAW; Jae Youn Kim

(57) ABSTRACT

Disclosed is a measurement system using a fiber Bragg grating sensor, which includes a sensing unit including a plurality of dynamic sensors and static sensors using fiber Bragg gratings to detect mutually different physical quantities to be measured, an optical meter configured to measure each physical quantity by simultaneously processing data output from the plurality of dynamic sensors and static sensors in real time, and a server configured to store and manage the data measured by the optical meter. Mutually different physical quantities are measured by simultaneously processing the data output from the plurality of dynamic sensors and static sensors in real time by using one optical meter.

5 Claims, 3 Drawing Sheets

(56) References Cited

U.S. PATENT DOCUMENTS

| | | | | |
|---|---|---|---|---|
| 2008/0106745 A1* | 5/2008 | Haber | ............... | G01B 11/18 |
| | | | | 356/519 |
| 2012/0086947 A1* | 4/2012 | Bazzone | ............ | G01K 11/3206 |
| | | | | 374/161 |
| 2014/0211202 A1* | 7/2014 | Niewczas | .......... | G01D 5/35387 |
| | | | | 356/73.1 |
| 2015/0036134 A1* | 2/2015 | Saitoh | ................ | G01K 11/3206 |
| | | | | 356/300 |
| 2021/0131835 A1* | 5/2021 | Daoud | ............... | G01D 5/35312 |

FOREIGN PATENT DOCUMENTS

| | | |
|---|---|---|
| KR | 10-2014-0059065 A | 5/2014 |
| KR | 10-2017-0075920 A | 7/2017 |
| KR | 10-2018-0071070 A | 6/2018 |
| KR | 10-1901389 B1 | 9/2018 |
| KR | 10-2020-0042518 A | 4/2020 |

\* cited by examiner

MEASUREMENT SYSTEM USING FIBER BRAGG GRATING SENSOR

BACKGROUND OF THE INVENTION

1. Field of the Invention

The present invention relates to a measurement system using a fiber Bragg grating sensor, and more specifically, to a measurement system using a fiber Bragg grating sensor, capable of simultaneously processing data from a high-speed sensor and a low-speed sensor using a fiber Bragg grating sensor in real time by using one optical meter.

2. Description of the Related Art

An optical fiber sensor refers to a sensor for estimating a quantity of measurement using the intensity of light passing through an optical fiber, a refractive index and a length of the optical fiber, a mode, and a change in a polarization state.

The main component of the optical fiber is quartz glass, and the optical fiber sensor consists of a core part, which is the center of the optical fiber, to which germanium is added so that the refractive index is slightly higher, and a cladding part, which is an overlapping layer that protects the center.

Light incident onto the optical fiber core is reflected at the interface between the core layer having a high refractive index and the cladding layer having a low refractive index and propagates along the optical fiber core.

Such optical fiber sensors are classified as an intensity type, a phase type, a diffraction grating type, a mode modulation type, a polarization type, a distribution measurement type, etc. according to the effect thereof, and provide various measurement values such as voltage, current, temperature, pressure, strain, rotation rate, sound, gas concentration, etc.

The optical fiber sensor is adapted for ultra-precise broadband measurement, is not affected by electromagnetic waves, is easy to measure remotely, does not use electricity in a sensor part, and has no restrictions on the environment of use due to the excellent corrosion resistance of silica material.

A representative one of the optical fiber sensors is a fiber Bragg grating sensor.

The fiber Bragg grating sensor refers to a sensor that uses the characteristic that the wavelength of light reflected from each grating varies according to changes in external conditions such as temperature or intensity after several fiber Bragg gratings are engraved on a single fiber along a predetermined length.

Therefore, the fiber Bragg grating sensor causes a change of light refraction in the grating when deformation occurs due to the action of a physical force on the optical fiber in which the grating is formed and measures the strain of the optical file by measuring the change of the light refraction. Thus, it is possible to know the loads and stresses acting on the structure by measuring the strain of the structure to which the optical sensor is fixed.

That is, the fiber Bragg grating sensor is configured by changing the refractive index of the optical fiber core at a constant period, and selectively reflects only light having a specific wavelength.

Such a fiber Bragg grating sensor has a unique wavelength value and has excellent physical properties against electromagnetic waves, so it is spotlighted as an excellent physical quantity measuring device that replaces the existing electric gauge, and the application range thereof is extensively increased in these days.

For this reason, the fiber Bragg grating sensor is used as a detection sensor for detecting a physical quantity such as strain, angle, acceleration, displacement, temperature, and pressure change by using the principle of total reflection, in which all light within a certain angle is reflected at the interface when light travels from a material with a high refractive index to a material with a low refractive index in the optical fiber.

For example, the applicant of the present invention has filed Patent Document 1 and Patent Document 2, which are registered and disclose techniques for measuring physical quantities such as displacement and strain by using a fiber Bragg grating sensor.

Meanwhile, a dynamic sensor that measures with a high speed more than 100 times per a second, such as an accelerometer, and a static sensor that measures with a slow speed having a measuring interval of 2 seconds or more, such as a goniometer, a displacement meter, and a thermometer are applied to a system that measures physical quantities such as acceleration, angle, displacement, temperature, and tunnel convergence using a fiber Bragg grating sensor.

In the measurement system according to the related art, when a plurality of the above-described dynamic and static sensors are installed and operated in the same site, an optical meter a high-speed sensor and an optical meter for a low-speed sensor are operated separately.

For example, in a measurement system to which ten 2-axis accelerometers, twenty 2-axis inclinometers, and sixteen crack gauges are applied, it is necessary to provide one optical meter for the high-speed sensor and one optical meter for the low-speed sensor.

In addition, in the measurement system to which eight 2-axis accelerometers, 384 1-axis displacement gauges, and 128 2-axis displacement gauges are applied, it is necessary to provide a total of three optical meters including one high-speed sensor and two low-speed sensors.

As described above, in the measurement system according to the related art, when a plurality of dynamic sensors and static sensors are installed and operated at the same site, the optical meter for the high-speed sensor and the optical meter for the low-speed sensor are operated separately, thereby increasing the measurement cost and lowering the efficiency.

(Patent Document 1) Korean Patent Registration No. 10-1057309 (issued on Aug. 16, 2011)

(Patent Document 2) Korean Patent Registration No. 10-1901389 (issued on Sep. 28, 2018)

SUMMARY OF THE INVENTION

The present invention has been made to solve the above problems, and an object of the present invention is to provide a measurement system using a fiber Bragg grating sensor, capable of simultaneous processing multiple sensor data in real time using one measurement instrument through a time-division measurement of static sensors when a plurality of dynamic sensors and static sensors are applied.

Another object of the present invention is to provide a measurement system using a fiber Bragg grating sensor, which reduces the number of measurement instruments and optical cables applied to the measurement system, thereby reducing the manufacturing cost of the system, and improving the operation efficiency of the measurement system.

In order to achieve the above objects, a measurement system using a fiber Bragg grating sensor according to the present invention includes: a sensing unit including a plurality of dynamic sensors and static sensors using fiber Bragg gratings to detect mutually different physical quantities to be measured; an optical meter configured to measure each physical quantity by simultaneously processing data output from the plurality of dynamic sensors and static sensors in real time; and a server configured to store and manage the data measured by the optical meter, wherein the mutually different physical quantities are measured by simultaneously processing the data output from the plurality of dynamic sensors and static sensors in real time by using one optical meter.

As described above, according to the measurement system using the fiber Bragg grating sensor of the present invention, it is possible to measure various physical quantities by simultaneously processing data output from a plurality of dynamic sensors and static sensors in real time by using one optical meter.

That is, according to the present invention, a channel connected to a first optical cable to which a plurality of dynamic sensors are connected is separated from a channel connected to a plurality of second optical cables to which a plurality of static sensors are installed, and a wavelength-division is carried out between a plurality of sensors connected to the same optical cable.

Alternatively, according to the present invention, a reference sensor is installed in each of a plurality of second optical cables, a second optical cable currently connected to a second channel is identified based on data output from each reference sensor, and data output from a plurality of static sensors installed in the identified second optical cable can be recognized as data of the corresponding second optical cable.

In addition, according to the present invention, data output from a plurality of dynamic sensors and static sensors is combined by using an optical coupler and the combined data is transmitted to an optical meter through one channel, so that the optical meter can identify the data measured by each sensor.

Therefore, according to the present invention, the data of the measured physical quantity is classified in terms of channels and wavelengths, and the data is stored and managed in the form of a table according to the measurement period of each sensor, so that the number of measurement instruments and optical cables applied to the measurement system can be reduced, thereby reducing the manufacturing cost of the system and improving the operation efficiency of the measurement system.

DETAILED DESCRIPTION OF THE INVENTION

Hereinafter, a measurement system using a fiber Bragg grating sensor according to preferred embodiments of the present invention will be described in detail with reference to the accompanying drawings.

First Embodiment

Figure 1:
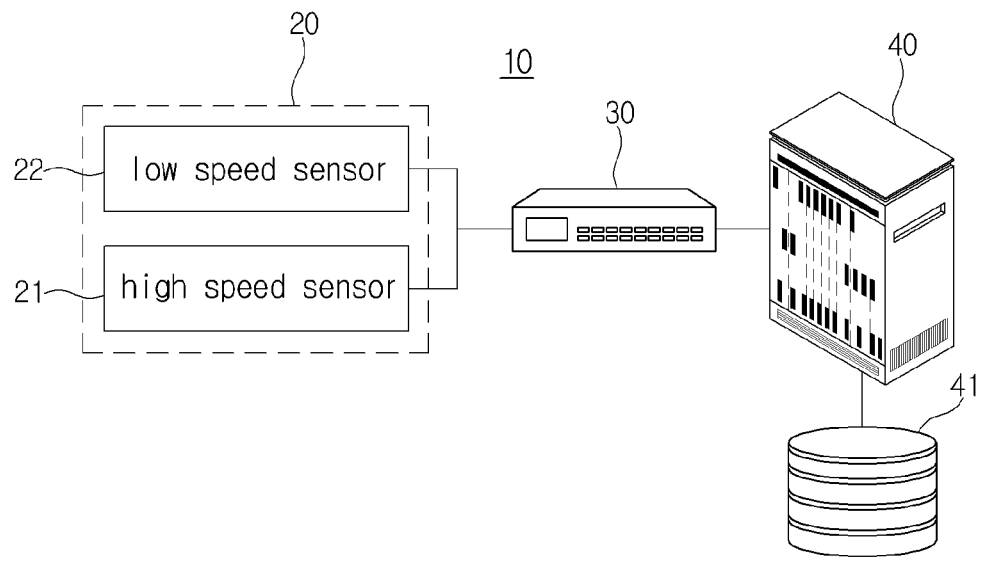
FIG. 1 is a view showing a configuration of a measurement system using a fiber Bragg grating sensor according to a first embodiment of the present invention.
Figure 2:
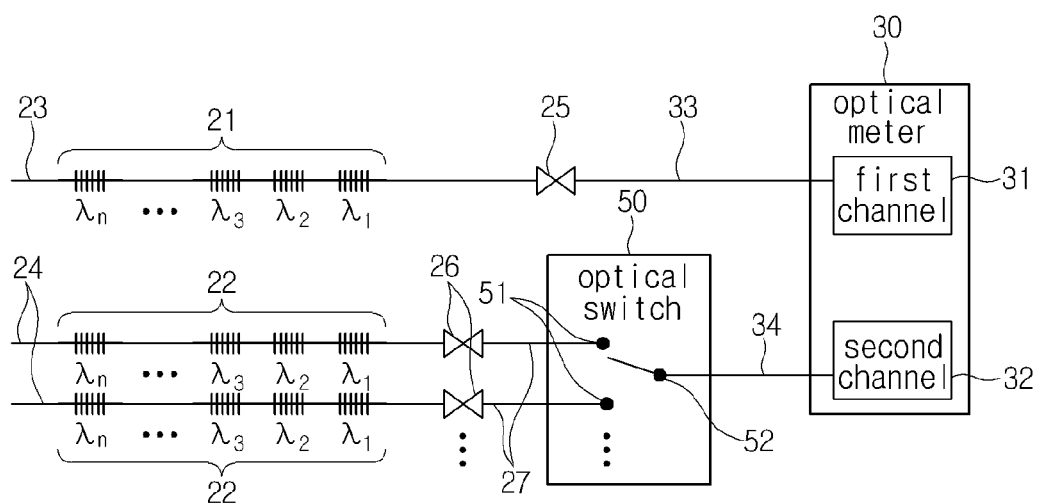
FIG. 2 is a detailed view of the measurement system shown in FIG. 1.

FIG. 1 is a view showing a configuration of a measurement system using a fiber Bragg grating sensor according to a first embodiment of the present invention, and FIG. 2 is a detailed view of the measurement system shown in FIG. 1.

As shown in FIGS. 1 and 2, a measurement system 10 using a fiber Bragg grating sensor according to the first embodiment of the present invention may include a sensing unit 20 including a plurality of dynamic sensors 21 and static sensors 22 using fiber Bragg gratings to detect mutually different physical quantities to be measured, an optical meter 30 configured to measure each physical quantity by simultaneously processing data output from the plurality of dynamic sensors 21 and static sensors 22 in real time, a server 40 configured to store and manage the measured data.

A dynamic fiber Bragg grating (FBG) sensor 21 using fiber Bragg gratings (hereinafter referred to as a 'dynamic sensor') may generate measurement data at a high speed of 100 times or more per a second. The dynamic sensor 21 may include an acceleration sensor.

A plurality of dynamic sensors 21 outputting detection signals of mutually different wavelengths may be coupled to one first optical cable 23 through an optical fusion process. The first optical cable 23 on which the plurality of dynamic sensors 21 are installed may be connected to a first channel 31 of the optical meter 30.

The first optical cable 23 may be optically connected to a third optical cable 33 connected to the first channel 31 of the optical meter 30 by a first optical connector 25 such that signal transmission is enabled therebetween.

The static FBG sensor (hereinafter referred to as a 'static sensor') 22 using an optical fiber grating may generate measurement data at a relatively low speed, for example, at a time interval of 5 seconds or more, compared to the dynamic sensor 21. The static sensor 22 may include at least one of a displacement sensor, a temperature sensor, an inclinometer, a tunnel convergence sensor, and a geologic inclination sensor.

A plurality of second optical cables 24 on which the plurality of static sensors 22 are installed may be selectively connected to the second channel 32 of the optical meter 30, respectively, by a switching operation of the optical switch 50.

To this end, the plurality of second optical cables 24 can be optically connected to a plurality of fourth optical cables 27 connected to a plurality of input terminals 51 provided at an input terminal of the optical switch 50 by a plurality of second optical connectors 26, respectively, such that signal transmission is enabled therebetween.

In addition, an output terminal 52 provided at an output terminal of the optical switch 50 may be optically connected to a fifth optical cable 34 connected to the second channel 32 of the optical meter 30 such that signal transmission is enabled therebetween.

That is, the optical switch 50 may perform the switching operation for switching the optical path to selectively make connection to the plurality of static sensors 22 and the second channel 32 of the optical meter 30 through the plurality of second optical cables 24 connected to the plurality of input terminals 51, respectively, and the fifth cable 34 connected to the output terminal 52.

The first to fifth optical cables 23, 24, 33, 27, and 34 may have a function of transmitting data output from each sensor 21 and 22, that is, detection signals having mutually different wavelengths to the optical meter 30, and may be formed of an optical fiber.

The plurality of dynamic sensors, that is, n dynamic sensors 21 connected to the first optical cable 23 may output data having mutually different wavelengths $\lambda_1$ to $\lambda_n$ according to a change in a physical quantity to be measured.

The plurality of static sensors, that is, n static sensors 22 connected to the plurality of second optical cables 24, respectively, may output data having mutually different wavelengths $\lambda_1$ to $\lambda_n$ according to a change in a physical quantity to be measured.

As described above, according to the present embodiment, the wavelengths of the plurality of dynamic sensors 21 connected to the same optical cable, that is, the first optical cable 23 and the wavelengths of the plurality of static sensors 22 connected to the same optical cable, that is, the second optical cable 24 are set mutually different from each other so that the plurality of dynamic sensors 21 and the plurality of static sensors 22 may be divided from each other, and the wavelengths of the plurality of static sensors 22 connected to a plurality of different second optical cables 24 may not be divided.

In addition, according to the present embodiment, channels for selectively connecting the first optical cable 23, to which the plurality of dynamic sensors 21 are connected, and the plurality of second optical cables 24, to which the plurality of static sensors 22 are connected, to the optical meter 30 may be divided.

That is, the optical meter 30 may include a first channel 31 receiving data output from the plurality of dynamic sensors 21 provided on the first optical cable 23, and a second channel 32 receiving data output from the plurality of static sensors 22 provided on the plurality of second optical cables 23.

The server 40 may be connected to the optical meter 30 to make communication with the optical meter 30, and may store and manage data received from the optical meter 30 in the database 41 by dividing the data according to the channel and wavelength.

The server 40 may store real-time data measured by using the plurality of dynamic sensors 21 and static sensors 22 in the database 41 as a table according to a measurement period for each sensor.

Hereinafter, a measurement method of the measurement system using the fiber Bragg grating sensor according to a preferred embodiment of the present invention will be described in detail with reference to FIG. 3.

Figure 3:
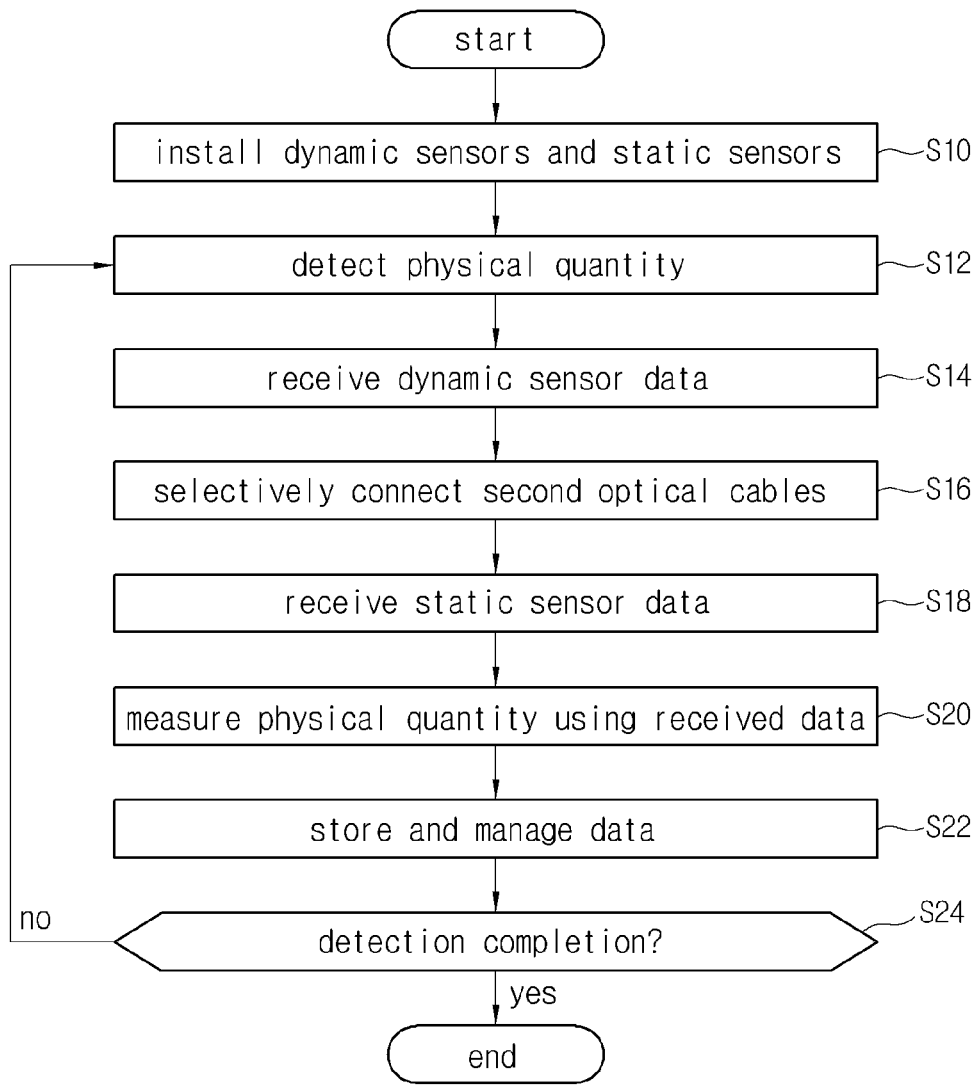
FIG. 3 is a flowchart for explaining steps of a measurement method of a measurement system using a fiber Bragg grating sensor according to a first embodiment of the present invention.

FIG. 3 is a flowchart illustrating the steps of the measurement method of the measurement system using the fiber Bragg grating sensor according to a first embodiment of the present invention.

In step S10 of FIG. 3, an operator installs the first optical cable 23 and the plurality of second optical cables 24, which are equipped with the plurality of dynamic sensors 21 and static sensors 22, respectively, in a structure or a location where various physical quantities such as acceleration, displacement, temperature, gradient, tunnel convergence, and geologic inclination are measured.

Then, each of the dynamic sensors 21 and the static sensors 22 detects a change in each physical quantity to be measured, and outputs data according to the detection result, that is, detection signals having mutually different wavelengths (S12).

The optical meter 30 connected to the first and second optical cables 23 and 24 measures each physical quantity based on the data received through each of the optical cables 23 and 24.

More specifically, in step S14, the first channel 31 of the optical meter 30 receives the data output from the first optical cable 23, the first optical connector 25, and the third optical cable 33 in which a plurality of dynamic sensors 21 are installed.

In this case, the optical switch 50 selectively connects the plurality of second optical cables 24, in which the plurality of static sensors 22 are installed, and the fourth optical cable 27 connected to the second optical connector 26 of the optical meter 30 to the fifth optical cable 34 connected to the second channel 32 (S16).

Such a switching operation of the optical switch 30 is continuously and repeatedly performed to sequentially connect the plurality of second optical cables 24 to the fifth optical cable 34 according to the measurement period of the static sensors 22 installed on the plurality of second optical cables 24, respectively.

Therefore, the second channel 32 of the optical meter 30 sequentially receives the data output from the plurality of static sensors 22, which are installed on the plurality of second optical cables 24, in the order of arrangement of the static sensors 22 (S18).

Then, the optical meter 30 measures each physical quantity by using the data of the plurality of dynamic sensors 21 received through the first channel 31 and the data of the plurality of static sensors 22 received through the second channel 32 (S20).

The server 40 classifies the data received from the optical meter 30 according to the channels and wavelengths, and stores and manages the data in the form of a table in the database 41 according to the measurement period for each sensor (S22).

Meanwhile, in step S24, the measurement system 10 checks whether the physical quantity sensing operation is completed, and repeats steps S12 to S24 until the sensing operation is completed.

If it is determined in step S24 that the physical quantity sensing operation is completed, the measurement system 10 stops the operation and ends the measurement.

As described above, according to the present invention, the channels connected to the first and second optical cables, in which the plurality of dynamic sensors and static sensors are installed, are divided and the plurality of sensors connected to the same optical cable are divided according to the wavelength.

Therefore, the present invention can measure various physical quantities by simultaneously processing the data output from the plurality of dynamic sensors and static sensors in real time by using one optical meter.

In addition, the present invention can classify the measured physical quantity data according to the channel and wavelength, and can store and manage the data in the form of a table according to the measurement period of each sensor.

Second Embodiment

Figure 4:
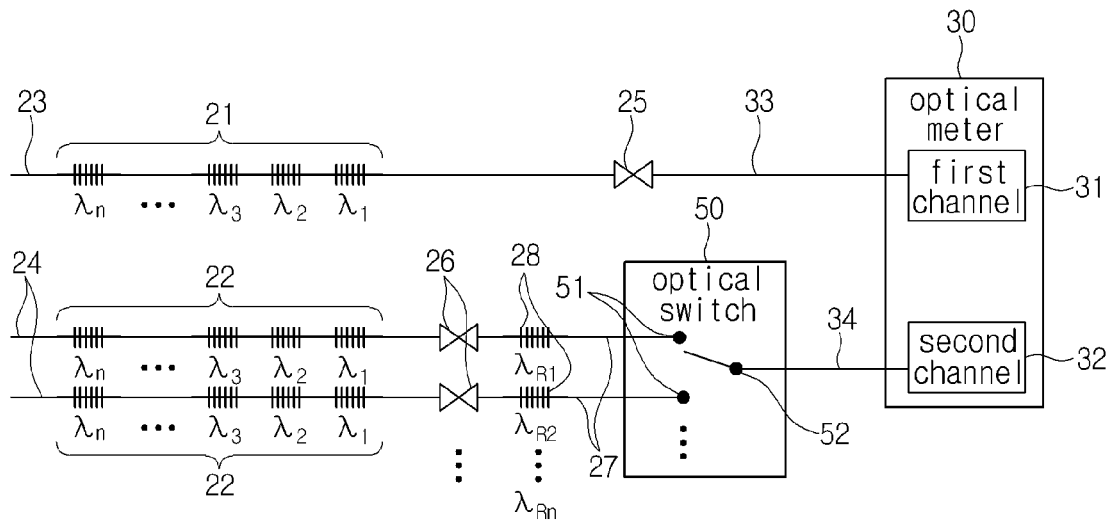
FIG. 4 is a detailed view of a measurement system using a fiber Bragg grating sensor according to a second embodiment of the present invention.

FIG. 4 is a detailed view of a measurement system using a fiber Bragg grating sensor according to a second embodiment of the present invention.

As shown in FIG. 4, the measurement system 10 using the fiber Bragg grating sensor according to the second embodiment of the present invention has the configuration similar to the configuration of the measurement system 10 using the fiber Bragg grating sensor described with reference to FIGS. 1 and 2, but further includes a plurality of reference sensors 28 installed between the plurality of second optical connectors 26 and the fourth optical cable 27 to output preset reference signals, respectively.

The plurality of reference sensors 28 can output reference signals $\lambda_{R1}$ to $\lambda_{Rn}$ having preset wavelength values in correspondence with FBG IDs assigned to each second optical cable 24 in order to classify the plurality of second optical cables 24.

Therefore, the optical meter 30 can identify the type of the second optical cable 24 currently connected to the second channel 32 through the switching operation of the optical switch 50 based on the reference signals $\lambda_{R1}$ to $\lambda_{Rn}$ of each reference sensor 28 input through the second channel 32.

In this manner, the present invention can identify the second optical cable currently connected to the second channel from among the plurality of second optical cables, and can recognize the data output from the plurality of static sensors installed on the identified second optical cable as data of the second optical cable.

Third Embodiment

Figure 5:
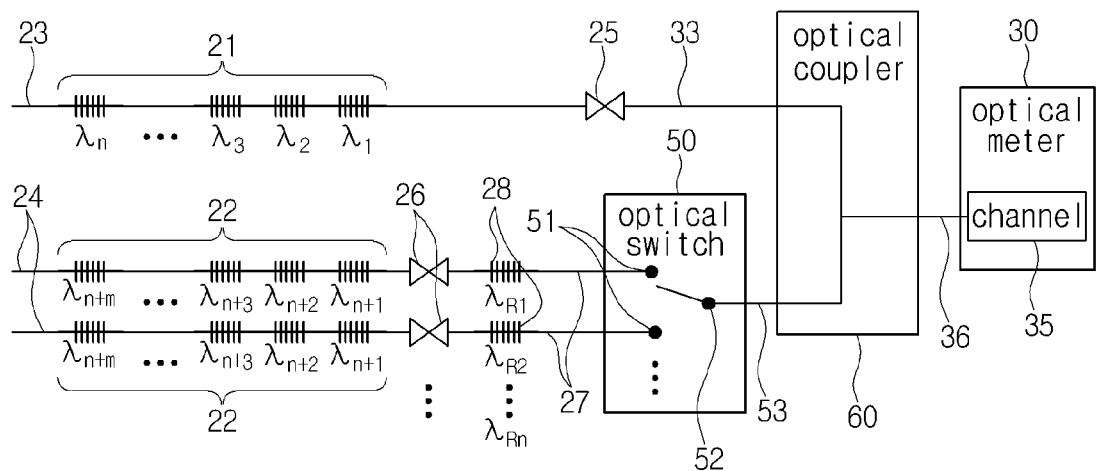
FIG. 5 is a detailed view of a measurement system using a fiber Bragg grating sensor according to a third embodiment of the present invention.

FIG. 5 is a detailed view of a measurement system using a fiber Bragg grating sensor according to a third embodiment of the present invention.

As shown in FIG. 5, the measurement system 10 using the fiber Bragg grating sensor according to the third embodiment of the present invention has the configuration similar to the configuration of the measurement system 10 using the fiber Bragg grating sensor described with reference to FIG. 4, but an optical coupler 60 may be further provided to combine data transmitted through the first optical connector 25 and the optical switch 50 and transmit the data to one channel 35 provided in the optical meter 30.

The third optical cable 33 and a sixth optical cable 53 connected to the output terminal of the optical switch 50 may be connected to the input terminal of the optical coupler 60, and the other end of a seventh optical cable 36 having one end connected to the channel 35 of the optical meter 30 may be connected to the output terminal of the optical coupler 60.

Thus, the optical meter 30 can identify the data output from the plurality of dynamic sensors 21 and the static sensors 22 transmitted through one channel 33 based on the reference signals $\lambda_{R1}$ to $\lambda_{Rn}$.

Preferably, according to the present embodiment, the data output from the plurality of dynamic sensors, that is, wavelengths $\lambda_1$ to $\lambda_n$ of the detection signals output from n dynamic sensors 21, and wavelengths $\lambda_{n+1}$ to $\lambda_{n+m}$ of the detection signals output from the plurality of the static sensors, that is, m static sensors 22 installed on the plurality of second optical cables 24, that is, n second optical cables 24 are set to have mutually different wavelength values such that the wavelength values do not redundant and the optical meter 30 can identify each sensor by distinguishing the sensors.

In this manner, according to the present embodiment, the data output from the plurality of dynamic sensors and the plurality of static sensors can be combined by using the optical coupler and the data can be transmitted to the optical meter through one channel, so that the optical meter can identify the data measured for each sensor.

Although the invention made by the present inventors has been described in detail according to the above embodiments, the present invention is not limited to the above embodiments, and various modifications can be made without departing from the scope of the present invention.

That is, although it has been described in the second and third embodiments that the reference sensor 28 for generating the reference signal is provided on the fourth optical cable 27 connected to the plurality of second optical cables 24 in which the plurality of static sensors 22 are installed, the present invention is not necessarily limited thereto.

For example, according to the present invention, the wavelengths of the sensors can be divided such that the plurality of dynamic sensors 21 installed on the first optical cable 23 and the plurality of static sensors 22 installed on each second optical cable 24 can output detection signals having mutually different wavelength values and the reference sensor 28 can be omitted. In this case, the optical meter 30 can measure mutually different physical quantities by identifying each sensor based on the data received from each dynamic sensor 21 and each static sensor 22, that is, the wavelength values of the detection signals output from each dynamic sensor 21 and each static sensor 22.

In addition, according to the present invention, a plurality of detection units 20, in which the plurality of dynamic sensors 21 and static sensors 22 are installed, can be provided and a plurality of first and second channels 31 and 32 can be provided in the optical meter 30, or a plurality of channels 35 can be provided in order to measure mutually different physical quantities at various locations by using one optical meter 30 based on the data output from the plurality of sensing units 20.

The present invention can be applied to a measurement system technique using a fiber Bragg grating sensor that stores and manages data output from a plurality of dynamic sensors and static sensors having mutually different measurement speeds by identifying the data according to the channel or sensor using one optical meter.

What is claimed is:

1. A measurement system using a fiber Bragg grating sensor, the measurement system comprising:
a sensing unit including a plurality of dynamic sensors and static sensors using fiber Bragg gratings to detect mutually different physical quantities to be measured;
an optical meter configured to measure each of the physical quantities by simultaneously processing data output from the plurality of dynamic sensors and static sensors in real time; and
a server configured to store and manage the data measured by the optical meter,
wherein the mutually different physical quantities are measured by simultaneously processing the data output from the plurality of dynamic sensors and static sensors in real time by using the optical meter,
wherein the plurality of dynamic sensors include an acceleration sensor that generates measurement data at a high speed of more than 100 times per a second and the plurality of dynamic sensors are installed on a first optical cable to output detection signals with mutually different wavelengths,
wherein the plurality of static sensors include at least one of a displacement sensor, a temperature sensor, an inclinometer, a tunnel convergence sensor, and a geologic inclination sensor that generate measurement data with a measurement period relatively slower than a measurement period of one of the plurality of dynamic sensors, and the plurality of static sensors are installed on a plurality of second optical cables, respectively, to output detection signals with mutually different wavelengths, wherein the measurement system further comprises an optical switch selectively connecting the plurality of second optical cables to a second channel of the optical meter, and wherein the optical switch continuously and repeatedly performs a switching operation for switching optical paths so as to sequentially connect the plurality of second optical cables to the second channel according to the measurement period of the plurality of static sensors installed on the plurality of second optical cables, respectively.

2. The measurement system of claim 1, wherein the optical meter includes a first channel for receiving data from each of the plurality of dynamic sensors and the second channel to receive data from each of the plurality of static sensors so as to measure each of the physical quantities by dividing channels receiving data from the plurality of dynamic sensors and the plurality of static sensors and dividing wavelengths between the plurality of sensors connected to the same optical cable, and the server classifies the data of the measured physical quantities according to channels and wavelengths to store and manage the data in a form of a table in a database.

3. The measurement system of claim 2, wherein a plurality of reference sensors for outputting preset reference signals are installed between the plurality of second optical cables and a plurality of input terminals provided on the optical switch, each of the plurality of reference sensors outputs a reference signal having a preset wavelength value in correspondence with an ID assigned to each of the plurality of second optical cables, and the optical meter identifies a second optical cable currently connected to the second channel based on data output from the plurality of reference sensors to recognize data output from the plurality of static sensors installed on the identified second optical cable as data of the second optical cable.

4. The measurement system of claim 1, further comprising an optical coupler that combines data output from the plurality of dynamic sensors installed on the first optical cable and data output from the plurality of static sensors and transmitted through the optical switch, wherein the optical meter identifies a second optical cable currently connected to the optical switch based on a wavelength value of the data output from the plurality of static sensors to recognize the data output from the plurality of static sensors installed on the identified second optical cable as data of the second optical cable, and the server classifies the data of the measured physical quantities according to wavelengths, and stores and manages the data in a form of a table in a database.

5. The measurement system of claim 4, wherein a plurality of reference sensors for outputting preset reference signals are installed between the plurality of second optical cables and a plurality of input terminals provided on the optical switch, each of the plurality of reference sensors outputs a reference signal having a preset wavelength value in correspondence with an ID assigned to each of the plurality of second optical cables, and the optical meter identifies a second optical cable currently connected to the optical switch based on the data output from the plurality of reference sensors to recognize the data output from the plurality of static sensors installed on the identified second optical cable as the data of the second optical cable.

* * * * *